United States Patent [19]

Kuwajima et al.

[11] Patent Number: 4,576,856

[45] Date of Patent: * Mar. 18, 1986

[54] RECONSTITUTED MICA MATERIALS, RECONSTITUTED MICA PREPREG MATERIALS, RECONSTITUTED MICA PRODUCTS AND INSULATED COILS

[75] Inventors: Hideji Kuwajima; Takeyoshi Watanabe, both of Hitachi, Japan

[73] Assignee: Hitachi Chemical Company, Ltd., Tokyo, Japan

[*] Notice: The portion of the term of this patent subsequent to Jan. 1, 2002 has been disclaimed.

[21] Appl. No.: 621,461

[22] Filed: Jun. 18, 1984

Related U.S. Application Data

[63] Continuation of Ser. No. 319,076, Nov. 6, 1981, abandoned.

[30] Foreign Application Priority Data

Nov. 19, 1980 [JP] Japan .............................. 55-163846
Oct. 8, 1981 [JP] Japan .............................. 56-161508

[51] Int. Cl.$^4$ ............................................. B32B 19/04
[52] U.S. Cl. .................................... 428/241; 428/283; 428/324; 428/363; 428/454; 524/449; 174/120 C; 174/137 B

[58] Field of Search ............... 162/138; 524/449; 428/413, 447, 480, 241, 283, 324, 363, 454; 241/4, 20; 174/110 SR, 110 S, 110 E, 120 C, 137 B

[56] References Cited

U.S. PATENT DOCUMENTS

| | | | |
|---|---|---|---|
| 3,026,222 | 3/1962 | Rogers, Jr. et al. | 428/324 |
| 3,133,217 | 5/1964 | Wohlferth et al. | 428/324 |
| 3,470,045 | 9/1969 | Bronnvall et al. | 428/324 |
| 3,618,753 | 11/1971 | Glasspoole | 428/324 |
| 4,085,250 | 4/1978 | Smith | 428/324 |
| 4,491,618 | 1/1985 | Kuwajima et al. | 428/324 X |

*Primary Examiner*—Joseph L. Schofer
*Assistant Examiner*—Fred M. Teskin
*Attorney, Agent, or Firm*—Antonelli, Terry & Wands

[57] ABSTRACT

A reconstituted mica material produced by sheet forming a slurry containing mica flakes prepared by disintegrating unfired mica and comprising (i) mica flakes having a particle size of 1.7 mm or more and an aspect ratio of 150 or more, (ii) mica flakes having a particle size of 1.0 mm or more and less than 1.7 mm and an aspect ratio of 150 or more, (iii) mica flakes having a particle size of 0.25 mm or more and less than 1.0 mm and an aspect ratio of 100 or more, and (iv) mica flakes having a particle size of less than 0.25 mm and an aspect ratio of 100 or more, in definite ranges, gives reconstituted mica prepreg materials, reconstituted mica products and insulated coils having excellent mechanical and electrical properties.

15 Claims, No Drawings

RECONSTITUTED MICA MATERIALS, RECONSTITUTED MICA PREPREG MATERIALS, RECONSTITUTED MICA PRODUCTS AND INSULATED COILS This is a continuation of application Ser. No. 319,076, filed Nov. 6, 1981, now abandoned.

BACKGROUND OF THE INVENTION

This invention relates to reconstituted mica materials, reconstituted mica prepreg materials, reconstituted mica products and insulated coils.

As reconstituted mica, there has generally been used so-called fired reconstituted mica produced by heating muscovite to about 800° C. for dehydration, disintegrating expanded muscovite with stirring in water or by a jet stream of water to give a slurry of mica flakes or scales having a particle size of as small as about 0.2 to 1.0 mm, and sheet forming by using the resulting slurry containing mica flakes to give mica foils. There has also been used so-called soft reconstituted mica produced by disintegrating phlogopite in water to give a slurry of mica flakes having a particle size of as small as about 0.2 to 2.0 mm, and sheet forming by using said slurry to give mica foils.

Fired mica cannot be disintegrated industrially to thin flakes of 5 to 10 mm square. Moreover, since fine cracks are produced in mica flakes or scales after leaving the water of crystallization of mica, strength of mica scales is low and an effect as a reinforcing material is small. Further, fired reconstituted mica has a density of as low as 1.3 to 1.5 g/cm³ and a large number of voids in the mica foils, so that a large amount of thermosetting resin composition is necessary for giving, for example, prepreg materials, which results in giving products having a larger resin content with poor mechanical and electrical properties when molded with heating under pressure. In order to give heat resistant reconstituted mica, when a large amount of heat resistant thermosetting resin composition is used, there takes place lowering in heat resistance or remarkable deterioration in properties in a long period of time.

On one hand, phlogopite is slightly superior to muscovite in heat resistance but inferior to muscovite in electrical properties, so that it cannot be used for insulating high voltage machines and instruments such as a dynamo.

On the other hand, in the case of disintegrated unfired mica particles, it is possible to lower the amount of binder and the like at the time of processing them to reconstituted mica products compared with disintegrated fired reconstituted mica particles, but they are insufficient in mechanical and electrical properties compared with splitting mica products.

In order to improve the above-mentioned defects, unfired reconstituted mica under a trade name of Micanite II has been devloped by U.S. SAMICA Corp. Micanite II is produced by disintegrating unfired muscovite flakes in water by using ultrasonic energy. Its particle size distribution is listed in Table 1 together with the particle size distribution of conventionally used reconstituted mica.

TABLE 1

| Average particle size (mm) | Micanite II | (% by weight) Conventional. reconstituted mica |
|---|---|---|
| 3.4 | 15 | 0 |
| 2.7 | 19 | 1 |
| 1.7 | 22 | 2 |
| 0.97 | 33 | 33 |
| 0.38 | 9 | 32 |
| 0.18 | 2 | 23 |
| 0.10 | 0 | 9 |

(from Catalogue of U.S. SAMICA Corp.)

Micanite II is unfired reconstituted mica but has tensile strength of as strong as 0.7 to 1.3 kgf/mm² without using a binder and the resulting mica foil has a density of as high as 1.6 to 1.7 g/cm³. But Micanite II has some defects caused by the particle size distribution as shown in Table 1. That is, since larger particles are used in Micanite II, reinforcing effect by the mica particles is great, which results in improving mechanical properties of processed mica products, but, on the other hand, since the closest packing can not be attained by using larger mica particles, deterioration of properties, particularly electrical properties after a long period of time is more remarkable than shown by splitting mica products.

Splitting mica products mean mica cleaved or delaminated by hand and having a diameter of about 50 mm or more and 30 to 50 μ thick. Since the size of this mica is so large that it cannot be sheet formed by using a wet type paper machine unlike reconstituted mica, it is sheet formed by hand or using a semiautomatic machine in practical production. Therefore, the production cost of splitting mica products becomes higher and finally the splitting mica products are more expensive than the reconstituted mica products because the former is not suitable for a large scale production by using a machine, and the like. Properties of the splitting mica products are excellent even after long time deterioration, since larger scales than a conventional reconstituted mica are used and the larger scale function as insulator even after the deterioration of binder.

In order to apply features of both the splitting mica products and the reconstituted mica products, combination of the both is proposed, for example, in Japanese Patent Appln. Kokai (Laid-Open) No. 58500/78, wherein both sides of delaminated mica sheet are bound with reconstituted mica sheets. The resulting product is improved in the accuracy of the thickness compared with the splitting mica product but rather lowered in properties after deterioration for a long period of time compared with the laminated mica product alone.

Improvement of the defects mentioned above has long been desired.

In the case of insulated electrical coils, they are produced by a process comprising winding splitting mica tape around a conductor, impregnating the wound tape with a thermosetting resin composition such as an epoxy resin composition, an unsaturated polyester resin under vacuum, and curing the resin, a so-called prepreg process comprising winding fired mica prepreg tape around a conductor, and molding with heating under pressure, or the like. The prepreg process is superior in initial electrical properties but not so good in other properties, while the vacuum impregnation process using splitting mica tape is superior in initial mechanical properties and electrical properties after deterioration by voltage endurance test but not so good in other properties.

When reconstituted mica is used, there has been no insulated coil having the same or higher properties compared with the case of using the splitting mica. An insulated coil having the same electrical properties as in the case of using the splitting mica is disclosed in Japanese Paten Appln. Kokoku (Post-Exam Publn) No. 20264/75. But the process disclosed therein has defects in that there are necessary complicated procedures such as wetting raw mica blocks with an aqueous solution of hydrofluoric acid or hydrogen choride, and also necessary for treating waste water. Further the resulting insulated coil is not so sufficient in mechanical properties since fired mica is used.

SUMMARY OF THE INVENTION

It is an object of this invention to provide reconstituted mica materials improved in the defects mentioned above. It is another object of this invention to provide reconstituted mica prepreg materials and reconstituted mica products having improved properties by using said reconstituted mica materials. It is a further object of this invention to provide insulated coils having excellent electrical and mechanical properties overcoming the defects mentioned above.

This invention provides a reconstituted mica material produced by sheet forming a slurry containing mica flakes prepared by disintegrating unfired mica and comprising:
(i) 2 to 25 parts by weight of mica flakes having a particle size of 1.7 mm or more and an aspect ratio of 150 or more,
(ii) 20 to 60 parts by weight of mica flakes having a particle size of 1.0 mm or more and less than 1.7 mm and an aspect ratio of 150 or more,
(iii) 20 to 40 parts by weight of mica flakes having a particle size of 0.25 mm or more and less than 1.0 mm and an aspect ratio of 100 or more, and
(iv) 10 to 30 parts by weight of mica flakes having a particle size of less that 0.25 mm and an aspect ratio of 100 or more, and if necessary, adhering the resulting mica sheet to a backing material.

This invention also provides a reconstituted mica prepreg material produced by sheet forming a slurry containing mica flakes prepared by disintegrating unfired mica and comprising:
(i) 2 to 25 parts by weight of mica flakes having particle size of 1.7 mm or more and an aspect ratio of 150 or more,
(ii) 20 to 60 parts by weight of mica flakes having a particle size of 1.0 mm or more and less than 1.7 mm and an aspect ratio of 150 or more,
(iii) 20 to 40 parts by weight of mica flakes having a particle size of 0.25 mm or more and less than 1.0 mm and an aspect ratio of 100 or more, and
(iv) 10 to 30 parts by weight of mica flakes having a particle size of less than 0.25 mm and an aspect ratio of 100 or more, to give a reconstituted mica material, impregnating or coating the reconstituted mica material with a thermosetting resin composition, and if necessary bound together with a backing material, and partially curing the impregnated or coated resin.

This invention further provides a reconstituted mica product produced by:
sheet forming a slurry containing mica flakes prepared by disintegrating unfired mica and comprising:
(i) 2 to 25 parts by weight of mica flakes having a particle size of 1.7 mm or more and an aspect ratio of 150 or more,
(ii) 20 to 60 parts by weight of mica flakes having a particle size of 1.0 mm or more and less than 1.7 mm and an aspect ratio of 150 or more,
(iii) 20 to 40 parts by weight of mica flakes having a particle size of 0.25 mm or more and less than 1.0 mm and an aspect ratio of 100 or more, and
(iv) 10 to 30 parts by weight of mica flakes having a particle size of less than 0.25 mm and an aspect ratio of 100 or more, to give a reconstituted mica material,
impregnating or coating the reconstituted mica material with a thermosetting resin composition or an inorganic composition, and
molding the resulting material with heating under pressure.

This invention still further provides an insulated electrical coil comprising an electrical conductor and an insulating layer wrapped around said conductor, said insulating layer comprises
(a) 60 to 85 parts by weight of reconstituted mica material produced by sheet forming a slurry containing mica flakes prepared by disintegrating unfired mica and comprising:
(i) 2 to 25 parts by weight of mica flakes having a particle size of 1.7 mm or more and an aspect ratio of 150 or more,
(ii) 20 to 60 parts by weight of mica flakes having a particle size of 1.0 mm or more and less than 1.7 mm and an aspect ratio of 150 or more,
(iii) 20 to 40 parts by weight of mica flakes having a particle size of 0.25 mm or more and less than 1.0 mm and an aspect ratio of 100 or more, and
(iv) 10 to 30 parts by weight of mica flakes having a particle size of less than 0.25 mm and an aspect ratio of 100 or more.
(b) 15 to 30 parts by weight of a thermosetting resin composition, and
(c) 15 parts by weight or less of backing material, the total weight of (a), (b) and (c) being 100 parts by weight.

The insulating layer can be formed by a conventional process, for example, a prepreg process, a vacuum impregnation process, or the like by using various forming conditions.

DETAILED DESCRIPTION OF THE PREFERRED EMBODIMENTS

In this invention, the aspect ratio is defined as follows:

$$\text{Aspect ratio} = \frac{\text{Diameter of mica flake}}{\text{Thickness of mica flake}}$$

Particle size distribution is measured by classifying mica flakes by a wet process using sieve analysis (Tyler mesh) and weighing after dried for calculation.

The process of disintegrating unfired mica to give mica flakes having the desired particle sizes and aspect ratios is disclosed, for example, in Japanese Patent Appln. Kokoku (Post-Exam Publn.) No. 8899/79, Japanese Patent Appln. Kokai (Laid-Open) No. 39984/78, and the like. The processes disclosed in these publications are particularly preferable for easily giving mica flakes having large aspect ratios and desired particle size distribution, since a disintegration apparatus and a classification apparatus are designed as one apparatus in these publications.

In order to form mica sheet, there should be used a slurry containing the following mica flakes prepared by disintegrating unfired mica:

(i) Mica flakes having a particle size of 1.7 mm or more and an aspect ratio of 150 or more in an amount of 2 to 25 parts by weight.

If the amount is more than 25 parts by weight, a reinforcing effect of mica flakes is great and mechanical properties are improved, but electrical properties, particularly dielectric breakdown voltage, changes remarkably. Further in the case of using a thermosetting resin composition such as for producing insulated coils, since spaces between mica flakes become larger, much more thermosetting resin composition is used so as to lower mechanical and electrical properties. On the other hand, if the amount is less than 2 parts by weight, mechanical and electrical properties of the resulting reconstituted mica products and insulated coils are lowered due to smaller reinforcing effect of the mica flake.

Further, the aspect ratio should be 150 or more. If the aspect ratio is less than 150, mechanical properties and electrical properties of the resulting reconstituted mica products and insulated coils are undesirably lowered.

(ii) Mica flakes having a particle size of 1.0 mm or more and less than 1.7 mm and an aspect ratio of 150 or more in an amount of 20 to 60 parts by weight.

If the amount is more than 60 parts by weight, electrical properties of an insulating layer changes remarkably. Further, since spaces between mica flakes become larger, much more thermosetting resin composition is required to fill the spaces, which results in lowering in mechanical and electrical properties. On the other hand, if the amount is less than 20 parts by weight, mechanical properties are lowered due to smaller reinforcing effect of mica flakes.

Further, the aspect ratio should be 150 or more. If the aspect ratio is less than 150, sheet strength of unfired reconstituted mica material produced by sheet forming without using a thermosetting resin composition is lowered, which results in making the handling of the unfired reconstituted mica material difficult.

(iii) Mica flakes having a particle size of 0.25 mm or more and less than 1.0 mm and an aspect ratio of 100 or more in an amount of 20 to 40 parts by weight.

If the amount is less than 20 parts by weight, since spaces between larger mica flakes cannot be filled effectively with mica flakes, mechanical and electrical properties are lowered. On the other hand, if the amount is more than 40 parts by weight, mechanical properties of the resulting reconstituted mica products or insulated coils are lowered because of an increase in the proportion of mica flakes having smaller particle sizes.

Further, when the aspect ratio of the mica flakes having a particle size of less than 1.0 mm is less than 100, sheet strength of unfired reconstituted mica material produced by sheet forming without using a thermosetting resin composition is lowered, which results in making the handling of the unfired reconstituted mica material difficult as well as lowering in electrical properties, particularly in dielectric breakdown voltage, of the resulting reconstituted mica products and insulated coils.

(iv) Mica flakes having a particle size of less than 0.25 mm and an aspect ratio of 100 or more in an amount of 10 to 30 parts by weight.

It the amount is less than 10 parts be weight, it is impossible to sufficiently fill spaces produced by using mica flakes having a particle size of 1.0 mm or more, which results in requiring a larger amount of binder for adhering the mica sheet to a backing material or a larger amount of thermosetting resin composition for filling spaces among mica flakes in the case of insulated coils or prepregs and lowering electrical properties due to deterioration after a long period of time. On the other hand, if the amount is more than 30 parts by weight, mechanical properties and electrical properties of the resulting reconstituted mica products or insulated coils are lowered because of an increase in the proportion of mica flakes having smaller particle sizes.

In this invention, the slurry for making mica sheet should contain the mica flakes (i), (ii), (iii) and (iv) mentioned above. Even if combining mica flakes having a particle size of less than 0.25 mm and those having a particle size of 1.0 mm or more, no mica sheet having the closest packing of mica flakes can be obtained, since the precipitation speeds of the former and the latter are different in 10 times or more and when sheet formed by using a wet type paper making machine, large mica flakes may be collected on one side and small mica flakes on the other side. Such a defect can only be removed by the use of the mica flake (iii) in the above-mentioned range.

The unfired mica includes mica not subjected to a firing treatment and mica obtained by removing organic components such as paper, wood, fibers and the like from scrap mica, cut mica, and the like by complete combustion in the air at a temperature from that not liberating the water of crystallization of mica (about 600° C. or lower) to that liberate ½ or less of the water of crystallization of mica.

When fired mica is used in place of the unfired mica, mechanical properties, particularly flexural strength and flexural modulus, are lowered remarkably in the resulting reconstituted mica materials, reconstituted mica prepreg materials and reconstituted mica products.

In this invention, any conventional processes for making mica sheet from the slurry can be used. For example, a slurry containing 0.5 to 2% by weight of mica flakes can be sheet formed by using, for example, a Fourdrinier paper machine, a cylinder paper machine, or the like under conventional conditions.

If necessary, the resulting mica sheet is adhered to a backing material. As the backing materials, there can be used woven fabric, nonwoven fabric, film, and the like made from organic materials such as polyesters, polyamides, polypropylenes, or inorganic materials such as glass, alone or in combination, and if necessary, together with glass yarns, polyester fiber yarns, etc. In such a case, a conventional binder such as a thermosetting resin is used for binding the both materials.

The resulting reconstituted mica material (in the form of sheet) can be used for producing a reconstituted mica prepreg material by impregnating or coating it with a thermosetting resin composition, and if necessary bound together with a backing material, and partially curing the impregnated or coated resin.

As the thermosetting resin composition, there can be used an epoxy resin composition, an unsaturated polyester resin composition, a silicone resin composition, and the like including therein one or more curing agents, surface active agents, solvents, reactive solvents, and the like conventional additives.

The impregnation or coating of the thermosetting resin composition can be carried out by a conventional method, for example, by dissolving the thermosetting resin composition in a solvent such as methyl ethyl ketone, acetone, methanol, etc., and impregnating the resulting solution into the reconstituted mica material or coating it using a conventional coating machine such as a spray nozzle, a brush coating machine, etc. After the impregnation or coating, the solvent is removed by drying the
resulting material using a drier with hot air, infrared rays, or the like.

The partial curing of the impregnated or coated resin can be carried out by a conventional method.

The same backing materials as mentioned above can also be used for producing the reconstituted mica prepreg material.

The reconstituted mica material (in the form of sheet) can also be used for producing a reconstituted mica product by impregnating or coating it with a thermosetting resin composition or an inorganic composition, and molding the resulting material with heating under pressure. As the thermosetting resin composition, those mentioned above for producing the prepreg can also be used. As the inorganic composition, there can be used compositions comprising aluminum phosphate, borosilicate glass, silicate glass, etc.

The same impregnation or coating method as mentioned above for producing the prepreg can also be used in this case.

The molding can be carried out with heating at a temperature sufficient for softening the thermosetting resin composition or higher and under pressure sufficient for making the resulting molded article into one piece and maintaining the pressure for a sufficient time for curing the softened thermosetting resin composition and shaping the product.

The reconstituted mica material (in the form of sheet) with or without a backing material can also be used for producing an insulated coil comprising an electrical conductor and an insulating layer wrapped around said conductor.

The insulating layer can be formed either by a so-called vacuum impregnation process or by a so-called prepreg process. There is no particular limit to the forming conditions.

More in detail, the reconstituted mica material, if necessary having a backing material, is wrapped around a conductor, impregnating the wrapped mica material with a thermosetting resen composition under reduced pressure or under pressure, and curing the thermosetting resin composition to give an insulated coil. Alternatively, a reconstituted mica prepreg material is formed first by impregnating the reconstituted mica material with a thermosetting resin composition, followed by partial curing of the resin, and then the resulting prepreg material is wrapped around a conductor and the resin is cured to give an insulated coil.

As the thermosetting resin composition and the backing material, those described above, e.g., for producing the reconstituted mica prepreg material, can also be used.

The insulating layer comprises (a) 60 to 85 parts by weight of the reconstituted mica material, (b) 15 to 30 parts by weight of the thermosetting resin composition and (c) 15 parts by weight or less of the backing material, the total weight being 100 parts by weight.

The reconstituted mica material is used in the insulating layer in an amount of 60 to 85 parts by weight. If the amount is less than 60 parts by weight, electrical properties such as dielectric strength of the insulated coil is lowered, while if the amount is more than 85 parts by weight, electrical properties and mechanical properties of the insulated coil is lowered remarkably due to much more spaces among the mica flakes.

The thermosetting resin composition is used in the insulating layer in an amount of 15 to 30 parts by weight. If the amount is less than 15 parts by weight, spaces are easily formed in the insulating layer to cause corona discharge and electrical properties of the insulated coil is lowered, and when stress such as bending, compression, or the like is given to the insulating layer, there takes place stress concentration, which results in lowering mechanical properties. On the other hand, if the amount is more than 30 parts by weight, not only mechanical properties of the insulated coil but also electrical properties after deterioration for a long period of time are lowered.

The backing material is used by binding it to the reconstituted mica material, if necessary, up to 15 parts by weight. If the amount is more than 15 parts by weight in the insulating layer, mechanical properties or electrical properties are lowered. For example, when woven fabric or nonwoven fabric of glass fiber is used as a backing material for the reconstituted mica material in an amount exceeding 15 parts by weight, the resulting insulated coil is lowered in electrical properties, but not in mechanical properties. When woven fabric, nonwoven fabric or film of polyester, polyamide, or the like is used as a backing material for the reconstituted mica material in an amount exceeding 15 parts by weight, the resulting insulated coil is lowered in mechanical properties and electrical properties after deterioration for a long period of time. The same thing can be applied to the case of using the combination of the film mentioned above and glass, or the combination of the film mentioned above and yarns of polyester fiber, and the like.

This invention is illustrated by way of the following examples, in which all parts and percents are by weight unless otherwise specified.

EXAMPLE 1

Reconstituted mica materials as listed in Table 2 were prepared by using slurries containing mica flakes in an amount of 1% dispersed in water and a Fourdrinier paper machine for sheet forming.

Table 2 also shows particle size distributions and aspect ratios of mica flakes used in each material.

TABLE 2

|  | Reconstituted mica material No. | | | | |
| --- | --- | --- | --- | --- | --- |
|  | 1 | 2 | 3 | 4 | 5 |
| Particle size distribution |  |  |  |  |  |
| 1.7 mm or more | 5 | 15 | 25 | 30 | — |
| 1.0 mm to less than 1.7 mm | 25 | 40 | 45 | 70 | 10 |
| 0.25 mm to less than 1.0 mm | 40 | 30 | 20 | — | 50 |
| Less than 0.25 mm | 30 | 15 | 10 | — | 40 |
| Aspect ratio |  |  |  |  |  |
| 1.7 mm or more | 200 | 200 | 100 | 200 | — |
| 1.0 mm to less than 1.7 mm | 150 | 150 | 100 | 150 | 150 |
| 0.25 mm to less than 1.0 mm | 120 | 120 | 80 | — | 120 |
| Less than 0.25 mm | 120 | 120 | 80 | — | 120 |
| Basis weight (g/m$^2$) | 200 | 200 | 200 | 200 | 200 |

On the other hand, an epoxy resin composition as listed in Table 3 was prepared.

TABLE 3

| Component | |
|---|---|
| Epoxy resin composition | |
| Bisphenol A type epoxy resin (GY 280, Ciba-Geigy Corp., epoxy equivalent 250 g/eq.) | 100 parts |
| BF$_3$ monoethylamine (BF$_3$-400, Hashimoto Kasei K.K.) | 3 parts |

The reconstituted mica material 1 (in sheet form) listed in Table 2 was coated with the epoxy resin composition listed in Table 3 heated at 60° C. in an amount of 100 g/m$^2$ and bound to glass cloth (WE05, Nitto Boseki Co., Ltd.) (35 g/m$^2$) as a backing material, followed by heating at 80° C. for 1 hour to give partially cured reconstituted mica prepreg material. The resulting prepreg was cut to a tape 30 mm wide. The tape was wrapped around a conductor (made of copper) of 9.5 mm × 36.5 mm with 1000 mm long 8 times with an overlap of the order of 50%. Then, the resulting wrapped conductor was heated at 100° C. and pressed so as to flow the epoxy resin composition out of the reconstituted mica prepreg material, while curing the epoxy resin composition at 170° C. for 3 hours to give an insulated coil having an insulating layer 3 mm thick. In the same manner, there were produced a total of four insulated coils two of which were used for a test under ordinary state and the rest of which were used for a test after thermal deterioration (130° C. for 10$^3$ hours). Dielectric breakdown strength was measured by raising a voltage at a speed of 2 KV/sec. Then, flexural strength was measured according to the four point method (outer span 550 mm, inner span 250 mm, test speed 5 mm/min). The amount of the epoxy resin composition was measured by heating the insulating layer at 600° C. for 2 hours.

The results are shown in Table 4 with average values.

EXAMPLE 2

The material 2 listed in Table 2 was coated with the epoxy resin composition listed in Table 3 heated at 60° C. in an amount of 100 g/m$^2$ and bound to glass cloth (35 g/m$^2$) as a backing material, followed by heating at 80° C. for 1 hour to give a partially cured reconstituted mica prepreg material. Using the resulting prepreg, 4 insulated coils were produced in the same manner as described in Example 1. Properties of the insulated coils were measured in the same manner as described in Example 1.

The results are shown in Table 4 with average values.

EXAMPLE 3

The material 3 listed in Table 2 was coated with the epoxy resin composition listed in Table 3 heated at 60° C. in an amount of 100 g/m$^2$ and bound to glass cloth (35 g/m$^2$) as a backing material, followed by heating at 80° C. for 1 hour to give a partially cured reconstituted mica prepreg material. Using the resulting prepreg, 4 insulated coils were produced in the same manner as described in Example 1. Properties of the insulated coils were measured in the same manner as described in Example 1.

The results are shown in Table 4 with average values.

COMPARATIVE EXAMPLE 1

The material 4 listed in Table 2 was coated with the epoxy resin composition listed in Table 3 heated at 60° C. in an amount of 100 g/m$^2$ and bound to glass cloth (35 g/m$^2$) as a backing material, followed by heating at 80° C. for 1 hour to give partially cured reconstituted mica prepreg material. Using the resulting prepreg, 4 insulated coils were produced in the same manner as described in Example 1. Properties of the insulated coils were measured in the same manner as described in Example 1.

The results are shown in Table 4 with average values.

COMPARATIVE EXAMPLE 2

The material 5 listed in Table 2 was coated with the epoxy resin composition listed in Table 3 heated at 60° C. in an amount of 100 g/m$^2$ and bound to glass cloth (35 g/m$^2$) as a backing material, followed by heating at 80° C. for 1 hour to give partially cured reconstituted mica prepreg material. Using the resulting prepreg, 4 insulated coils were produced in the same manner as described in Example 1. Properties of the insulated coils were measured in the same manner as described in Example 1.

The results are shown in Table 4 with average values.

TABLE 4

| Example No. | Example 1 | Example 2 | Example 3 | Comparative Example 1 | Comparative Example 2 |
|---|---|---|---|---|---|
| Reconstituted mica material No. | 1 | 2 | 3 | 4 | 5 |
| Amount of epoxy resin composition (%) | 22.1 | 23.0 | 23.5 | 25.5 | 23.3 |
| Flexural strength (kgf/cm$^2$) | 1580 | 1600 | 1630 | 1620 | 1340 |
| Dielectric breakdown strength (KV) | 126 | 116 | 106 | 96 | 104 |
| Dielectric breakdown strength after deterioration (KV) | 120 | 108 | 92 | 70 | 98 |

EXAMPLE 4

The reconstituted mica material 1 listed in Table 2 was coated with the epoxy resin composition listed in Table 3 heated at 60° C. in an amount of 25 g/m$^2$ and bound to glass cloth (WE 05) (35 g/m$^2$) as a backing material, followed by heating at 80° C. for 15 minutes to give a partially cured reconstituted mica material. The resulting material was cut to a tape 30 mm wide. The tape was wrapped around a conductor (made of copper) of 9.5 mm × 36.5 mm with 1000 mm long 8 times with an overlap of the order of 50%. Then, the taped portion was molded under pressure to the thickness of 3 mm. The resulting taped coil was left in a vacuum vessel under a pressure of 1×10$^{-2}$ mm Hg for 30 minutes, followed by puring the epoxy resin composition listed in Table 3 heated at 80° C. into the vessel for dipping the taped coil. The pressure of the vacuum vessel was increased to normal pressures while maintaining the dipping state. After 1 hour, the taped coil was taken out and cured at 170° C. for 3 hours to give an insulated coil having an insulating layer 3 mm thick. In the same manner, there were produced a total of four insulated coils, properties of which were measured in the same manner as described in Example 1.

The results are shown in Table 5 with average values.

EXAMPLE 5

The material 2 listed in Table 2 was processed in the same manner as described in Example 4. In the same manner as described in Example 4, four insulated coils were produced. Properties of these coils were measured in the same manner as described in Example 1.

The results are shown in Table 5 with average values.

COMPARATIVE EXAMPLE 3

The material 4 listed in Table 2 was processed in the same manner as described in Example 4. In the same manner as described in Example 4, there were produced four insulated coils, properties of which were measured in the same manner as described in Example 1.

The results are shown in Table 5 with average values.

TABLE 5

| Example No. | Example 4 | Example 5 | Comparative Example 3 |
|---|---|---|---|
| Reconstituted mica material No. | 1 | 2 | 4 |
| Amount of epoxy resin composition (%) | 22.0 | 23.2 | 25.7 |
| Flexural strength (kgf/cm$^2$) | 1590 | 1600 | 1610 |
| Dielectric breakdown strength (KV) | 128 | 116 | 98 |
| Dielectric breakdown strength after deterioration (KV) | 122 | 108 | 68 |

Reconstituted mica materials, reconstituted mica products and insulated coils using the same which contain no mica flakes having a particle size of less than 1 mm are low in electrical properties and show remarkable lowering in electrical properties by thermal deterioration for a long period of time. Further those containing no mica flakes having a particle size of 1.7 mm or more show a tendency to lower mechanical properties. By the use of special mica flakes of this invention, insulated coils having excellent mechanical properties (flexural strength) and electrical properties can be produced.

EXAMPLE 6

Reconstituted mica materials as listed in Table 6 were prepared by using slurries containing mica flakes in an amount of 0.5% dispersed in water and a Fourdrinier paper machine for sheet forming at a rate of 5 m/min at 80°–90° C. Table 6 also shows particle size distributions and aspect ratios of mica flakes used in each material.

TABLE 6

| | Reconstituted mica material No. | | | | |
|---|---|---|---|---|---|
| | 6 | 7 | 8 | 9 | 10 |
| Particle size distribution | | | | | |
| 1.7 mm or more | 4 | 10 | 25 | 0 | 20 |
| 1.0 mm to less than 1.7 mm | 60 | 50 | 40 | 40 | 40 |
| 0.25 mm to less than 1.0 mm | 20 | 20 | 20 | 40 | 20 |
| Less than 0.25 mm | 16 | 20 | 15 | 20 | 20 |
| Aspect ratio | | | | | |
| 1.7 mm or more | 200 | 200 | 200 | — | 50 |
| 1.0 mm to less than 1.7 mm | 200 | 200 | 200 | 200 | 50 |
| 0.25 mm to less than 1.0 mm | 120 | 120 | 120 | 120 | 50 |
| Less than 0.25 mm | 120 | 120 | 120 | 120 | 30 |
| Basis weight (g/m$^2$) | 200 | 200 | 200 | 200 | 200 |

The reconstituted mica material 6 (in sheet form) listed in Table 6 was coated with the epoxy resin composition listed in Table 3 heated at 60° C. in an amount of 100 g/m$^2$ and bound to glass cloth (35 g/m$^2$) as a backing material, followed by heating at 80° C. for 1 hour to give partially cured reconstituted mica prepreg material. The resulting prepreg was cut to a tape 30 mm wide. The tape was wrapped around a conductor (made of copper) of 9.5 mm × 36.5 mm with 1000 mm long 8 times with an overlap of the order of 50%. Then, the resulting wrapped conductor was heated at 100° C. and pressed so as to flow the epoxy resin composition out of the reconstituted mica prepreg material, while curing the epoxy resin composition at 170° C. for 3 hours to give an insulated coil having an insulating layer 3 mm thick. In the same manner, there were produced a total of four insulated coils, two of which were used for a test under ordinary state and the rest of which were used for a test after thermal deterioration (130° C. for 10$^3$ hours). Dielectric breakdown strength was measured by raising a voltage at a speed of 2 KV/sec. Then, flexural strength was measured according to the four point method (outer span 550 mm, inner span 250 mm, test speed 5 mm/min). The amount of the epoxy resin composition (adhesive) was measured by heating the insulating layer at 600° C. for 2 hours.

The results are shown in Table 7 with average valves.

EXAMPLE 7

The material 7 listed in Table 6 was coated with the epoxy resin composition listed in Table 3 heated at 60° C. in an amount of 100 g/m$^2$ and bound to glass cloth (35 g/m$^2$) as a backing material, followed by heating at 80° C. for 1 hour to give a partially cured reconstituted mica prepreg material. A tape 30 mm wide was cut from the resulting prepreg material and wrapped around the same conductor as used in Example 6, 8 times with an overlap of the order of 50% to give a total of 4 insulated coils in the same manner as described in Example 6. Properties of the insulated coils were measured in the same manner as described in Example 6.

The results are shown in Table 7 with average values.

EXAMPLE 8

The material 8 listed in Table 6 was coated with the epoxy resin composition listed in Table 3 heated at 60° C. in an amount of 100 g/m$^2$ and bound to glass cloth (35 g/m$^2$) as a backing material, followed by heating at 80° C. for 1 hour to give a partially cured reconstituted mica prepreg material. A tape 30 mm wide was cut from the resulting prepreg material and wrapped around the same conductor as used in Example 6, 8 times with an overlap of the order of 50% to give a total of 4 insulated coils in the same manner as described in Example 6. Properties of the insulated coils were measured in the same manner as described in Example 6.

The results are shown in Table 7 with average values.

COMPARATIVE EXAMPLE 4

The material 9 listed in Table 6 was coated with the epoxy resin composition listed in Table 3 heated at 60° C. in an amount of 100 g/m$^2$ and bound to glass cloth (35 g/m$^2$) as a backing material, followed by heating at 80° C. for 1 hour to give a partially cured reconstituted mica prepreg material. A tape 30 mm wide was cut from the resulting prepreg material and wrapped around the same conductor as used in Example 6, 8 time with an overlap of the order of 50% to give a total of 4 insulated coils in the same manner as described in Example 6.

Properties of the insulated coils were measured in the same manner as described in Example 6.

The results are shown in Table 7 with average values.

TABLE 7

| Example No. | Example | | | Comparative Example | | Example | Comparative Example |
|---|---|---|---|---|---|---|---|
| | 6 | 7 | 8 | 4 | 5 | 9 | 6 |
| Reconstituted mica material No. | 6 | 7 | 8 | 9 | 10 | 7 | 10 |
| Amount of epoxy resin composition (%) | 19.5 | 21.0 | 20.8 | 24.6 | 28.8 | 16.7 | 27.4 |
| Flexural strength (Kgf/cm$^2$) | 1580 | 1610 | 1630 | 1480 | 1350 | 1600 | 1350 |
| Dielectric breakdown strength (KV) | 132 | 118 | 104 | 128 | 90 | 120 | 92 |
| Dielectric breakdown strength after deterioration (KV) | 128 | 116 | 104 | 120 | 88 | 114 | 86 |

The results are shown in Table 7 with average values.

COMPARATIVE EXAMPLE 5

The material 10 listed in Table 6 was coated with the epoxy resin composition listed in Table 3 heated at 60° C. in an amount of 100 g/m$^2$ and bound to glass cloth (35 g/m$^2$) as a backing material, followed by heating at 80° C. for 1 hour to give a partially cured reconstituted mica prepreg material. A tape 30 mm wide was cut from the resulting prepreg material and wrapped around the same conductor as used in Example 6, 8 times with an overlap of the order of 50% to give a total of 4 insulated coils in the same manner as described in Example 6. Properties of the insulated coils were measured in the same manner as described in Example 6.

The results are shown in Table 7 with average values.

EXAMPLE 9

On the reconstituted mica material 7 listed in Table 6, glass cloth (35 g/m$^2$) as a backing material was piled. A varnish prepared by dissolving the epoxy resin composition listed in Table 3 with methyl ethyl ketone and containing a nonvolatile content of 20% was coated on the glass cloth in an amount of 75 g/m$^2$ (converted to nonvolatile content 15 g/m$^2$) and dried at 100° C. for 30 minutes. The resulting material was cut to a tape 30 mm wide. The tape was wrapped around the same conductor as used in Example 6, 8 times with an overlap of the order of 50%. Then, the resulting coil was dried at 100° C. and 0.1 mmHg for 2 hours and impregnated with the epoxy resin composition listed in Table 3 heated at 80° C. under the same pressure. The pressure was then increased to normal pressures while dipping the coil in the epoxy resin composition, and the coil was taken out after 1 hour and covered iwth Lumirror film 2 mil thick (manufactured by Toray Industries, Inc.) so as to prevent the coil from dropping out of the epoxy resin composition. After cured at 110° C. for 4 hours and 170° C. for 3 hours, an insulating layer 3 mm thick was formed. Properties of the resulting four insulated coils were evaluated in the same manner as described in Example 6.

The results are shown in Table 7 with average values.

COMPARATIVE EXAMPLE 6

Using the material 10 listed in Table 6, tape was prepared in the same manner as described in Example 9. Four insulated coils were produced by using the resulting tape in the same manner as described in Example 9. Properties of the insulated coils were evaluated in the same manner as described in Example 6.

The results are shown in Table 7 with average values.

The insulated coils of this invention have insulating layers of enhanced mechanical properties, since reconstituted mica materials formed from mica flakes having larger particle sizes and higher aspect ratios are used, and also have insulating layers of enhanced electrical properties since spaces between larger mica flakes can be filled with smaller mica flakes.

Further, when a reconstituted mica material wherein spaces between larger mica flakes are filled with smaller mica flakes is used, the amount of the adhesive (thermosetting resin composition) can be reduced. And even if the amount of the thermosetting resin composition is reduced, initial properties such as electrical and mechanical properties of the insulated coils are not lowered and still excellent in properties after deterioration for a long period of time (for example, properties after deterioration by voltage endurance test), which properties are the same or higher than those of insulated coils using splitting mica products.

What is claimed is:

1. A reconstituted mica material produced by sheet forming a slurry containing mica flakes prepared by disintegrating unfired mica and comprising:
   (i) 2 to 25 parts by weight of mica flakes having a particle size of 1.7 mm or more and an aspect ratio of 150 or more,
   (ii) 20 to 60 parts by weight of mica flakes having a particle size of 1.0 mm or more and less than 1.7 mm and an aspect ratio of 150 more,
   (iii) 20 to 40 parts by weight of mica flakes having a particle size of 0.25 mm or more and less that 1.0 mm and an aspect ratio of 100 or more, and
   (iv) 10 to 30 parts by weight of mica flakes having a particle size of less than 0.25 mm and an aspect ratio of 100 or more; said reconstituted mica material exhibiting a flexural strength of 1580 kgf/cm$^2$ or more, a dielectric breakdown strength of 104 kV or more and a dielectric breakdown strength after deterioration of 92 kV or more when formed into a prepreg material.

2. A reconstituted mica material according to claim 1, which further comprises a backing material bound to the reconstituted mica material.

3. A reconstituted mica material according to claim 2, wherein the backing material is woven fabric, nonwoven fabric or film made from an organic material or an inorganic material.

4. A reconstituted mica prepreg material produced by sheet dorming a slurry containing mica flakes prepared by disintegrating unfired mica and comprising:

(i) 2 to 25 parts by weight of mica flakes having a particle size of 1.7 mm or more and an aspect ratio of 150 or more, (ii) 20 to 60 parts by weight of mica flakes having a particle size of 1.0 mm or more and less than 1.7 mm and an aspect ratio of 150 or more, (iii) 20 to 40 parts by weight of mica flakes having a particle size of 0.25 mm or more and less than 1.0 mm and an aspect ratio of 100 or more, and (iv) 10 to 30 parts by weight of mica flakes having a particle size of less than 0.25 mm and an aspect ratio of 100 or more, to form a reconstituted mica material, impregnating or coating the reconstituted mica material with a thermosetting resin composition, and partially curing the impregnated or coated resin; said prepreg material exhibiting a flexural strength of 1580 kgf/cm$^2$ or more, a dielectric breakdown strength of 104 kV or more and a dielectric breakdown strength after deterioration of 92 kV or more.

5. A reconstituted mica prepreg material according to claim 4, wherein the reconstituted mica material is bound to a backing material after impregnation or coating with the thermosetting resin composition and before partial curing of the resin composition.

6. A reconstituted mica prepreg material according to claim 5, wherein the backing material is woven fabric, nonwoven fabric or film made from an organic material or an inorganic material.

7. A reconstituted mica product produced by sheet forming a slurry containing mica flakes prepared by disintegrating unfired mica and comprising:

(i) 2 to 25 parts by weight of mica flakes having a particle size of 1.7 mm or more and as aspect ratio of 150 or more, (ii) 20 to 60 parts by weight of mica flakes having a particle size of 1.0 mm or more and less than 1.7 mm and an aspect ratio of 150 or more, (iii) 20 to 40 parts by weight of mica flakes having a particle size of 0.25 mm or more and less than 1.0 and an aspect ratio of 100 or more, and (iv) 10 to 30 parts by weight of mica flakes having a particle size of less than 0.25 and an aspect ratio of 100 or more, to give a reconstituted mica material, impregnating or coating the reconstituted mica material with a thermosetting resin composition or an inorganic composition, and molding the resulting material with heating under pressure; said mica product exhibiting a flexural strength of 1580 kgf/cm$^2$ or more, a dielectric breakdown strength of 104 kV or more and a dielectric breakdown strength after deterioration of 92 kV or more.

8. A reconstituted mica product according to claim 7, wherein the thermosetting resin composition contains as a resin component an epoxy resin, an unsaturated polyester resin, or a silicone resin.

9. A reconstituted mica product according to claim 7, wherein the inorganic composition is a mixture of alumina sol and orthophosphoric acid.

10. An insulated electrical coil comprising an electrical conductor and an insulating layer wrapped around said conductor, said insulating layer comprises:

(a) 60 to 85 parts by weight of reconstituted mica material produced by sheet forming a slurry containing mica flakes prepared by disintegrating unfired mica and comprising:

(i) 2 to 25 parts by weight of mica flakes having a particle size of 1.7 mm or more and an aspect ratio of 150 or more, (ii) 20 to 60 parts by weight of mica flakes having a particle size of 1.0 mm or more and less than 1.7 mm and an aspect ratio of 150 or more.

(iii) 20 to 40 parts by weight of mica flakes having a particle size of 0.25 mm or more and less than 1.0 mm and an aspect ratio of 100 or more, and (iv) 10 to 30 parts by weight of mica flakes having a particle size of less than 0.25 mm and an aspect ratio of 100 or more, (b) 10 to 30 parts by weight of a thermosetting resin composition, and (c) 15 parts by weight or less of a backing material, the total weight of (a), (b) and (c) being 100 parts by weight; said insulating layer exhibiting a flexural strength of 1580 kgf/cm$^2$ or more, a dielectric breakdown strength of 104 kV or more and a dielectric breakdown after deterioration of 92 kV or more.

11. An insulated electrical coil according to claim 10, wherein the thermosetting resin composition contains as a resin component an epoxy resin, an unsaturated polyester resin, or a silicone resin.

12. An insulated electrical coil according to claim 10, wherein the backing material is bound to the reconstituted mica material and is woven fabric, nonwoven fabric or film made from an organic material or an inorganic material.

13. An insulated electrical coil according to claim 10, wherein the backing material is woven fabric, nonwoven fabric or film made from a polyester, polyamide, glass, or a combination of polyester or polyamide and glass yarns or polyester fiber yarns.

14. A reconstituted mica prepreg material according to claim 4, wherein the thermosetting resin composition contains as a resin component an epoxy resin, an unsaturated polyester resin, or a silicone resin.

15. A reconstituted mica prepreg material according to claim 5, wherein the thermosetting resin composition contains as a resin component an epoxy resin, an unsaturated polyester resin, or a silicon resin.

* * * * *